Feb. 15, 1944.  K. GÖTZINGER  2,341,609
SAUSAGE MACHINE
Filed April 7, 1941
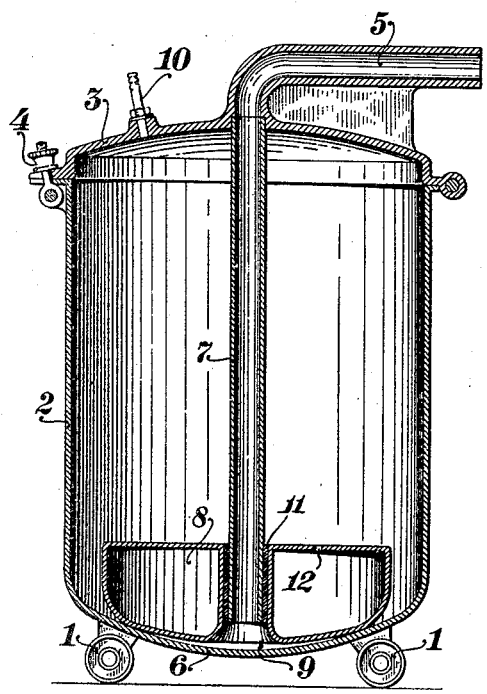
Inventor
Karl Gotzinger
by Foster & Codier
his Attorneys Patented Feb. 15, 1944

2,341,609

UNITED STATES PATENT OFFICE 2,341,609

SAUSAGE MACHINE

Karl Götzinger, Ternitz, N. D., Germany; vested in the Alien Property Custodian

Application April 7, 1941, Serial No. 387,351
In Germany March 26, 1940

4 Claims. (Cl. 17—39)

The invention relates to improvements in sausage machines or apparatus, in which the discharge of sausage filling material takes place from near the middle of the bottom of a container, and in which a convex hollow follower body of slightly smaller diameter than the diamter of the container and with a greater radius of curvature of its convex bottom surface than that of the container bottom is provided, which body rests under its own weight on the filling material.

The invention has for its object, to provide a considerably simplified arrangement which is cheaper to produce and of lighter weight and particularly simple and easy to manipulate and operate.

According to the invention this is attained by mounting in the interior of the container a riser pipe, which extends close to but above the container bottom and is connected with the discharge means provided on the lid, and a pressure distributing follower body which rests upon the filling material and is guided on the riser pipe so that it can slide up and down. The pressure distributing body is of smaller diameter than that of the container, and the portion of its bottom surface which bears against the container bottom when the pressure distributing body is in its lowermost position has a greater radius of curvature than the container bottom.

An embodiment of the invention is illustrated by way of example in the accompanying drawing, in elevation and partly in section.

According to the embodiment illustrated, the cylindrical container 2 movable on rollers 1 is adapted to be closed air tight by means of a lid 3 and wing nut screws 4. A passage 5 is provided in the lid 3, at the outlet end of which passage the sausage skin to be filled can be connected directly or indirectly. With the inner end of the passage 5 situated in the middle of the lid 3 a tube 7 is connected which, when the lid is placed on the container, extends close to but above the bottom 6 of the container 2, the cylindrical pressure distributing follower body 8 being guided elastically and well packed on said riser tube 7 by means of an elastic bushing or packing 11 which is slidable with the follower body 8 on the riser tube 7 and which provides a substantially fluid tight sliding connection between the riser tube 7 and the follower body 8.

The diameter of the pressure distributing body 8 is appreciably smaller than the diameter of the container 2. When the pressure distributing body 8 comes to rest upon the bottom of the container, a hollow space 9 is formed between the pressure distributing body 8 and the interior surface of the container bottom and is shut off from the interior of the container, which is filled with air under pressure, since the pressure distributing body 8 is tightly pressed upon the container bottom, so that no air under pressure can get into the riser tube and then into the sausage. In order to effect this closure or seal and to form a correspondingly large hollow space 9, the surface of the bottom of the pressure distributing body 8 bearing on the surface of the bottom plate 6 of the container is curved, as shown in the drawing, according to a greater radius than the container bottom 6, the middle portion of the bottom surface of the pressure distributing body 8 being curved upwards in such manner that in the lowermost position of this body this middle portion joins the lower end of the riser pipe 7. The pressure distributing body 8 can either be hollow, as shown, or it may be constructed as a cup open in upward direction. The opening 12 in the top of the follower body is provided to equalize the pressure within the hollow follower body with the pressure outside of it.

The air under pressure flows into the container 2 through the tube 10 mounted in the lid 3 and presses, between the pressure distributing follower body 8 and the wall of the container 2, and also by action upon the pressure distributing follower body 8, upon the filling material, on which this pressure distributing body rests. The filling material is pressed into the lower end of the riser pipe 7 by the descending pressure distributing body 8 and is pressed through the passage 5, into the sausage skin connected with the passage 5.

I claim:

1. Apparatus for filling sausage skins with filling material, said apparatus comprising a container for holding sausage filling material, said container having lateral confining means and a bottom and being able to receive and hold a gas under pressure; a vertically disposed conduit in said container with inlet near the bottom of said container, through which conduit sausage filling material can be discharged from said container for filling into sausage skins; a follower in said container and which is guided for vertical movement in said container by said conduit, said follower having its perimetric portions spaced from the lateral confining means of the container and said follower having a convex portion meeting the bottom of the container, when the follower is in its lowermost position, and forming therewith a seal against the entry of gas under pressure into the inlet end of said conduit; and means for introducing a gas under pressure within said container.

2. Apparatus for filling sausage skins with filling material, said apparatus comprising a container for holding sausage filling material, said container having lateral confining means and a bottom with an interior concave portion and being able to receive and hold a gas under pressure; a vertically disposed conduit in said container with inlet near the bottom of said container, through which conduit sausage filling material can be discharged from said container for filling into sausage skins; a follower in said container and which is guided for vertical movement in said container by said conduit, said follower having its perimetric portions spaced from the lateral confining means of the container and said follower having a convex portion of greater radius of curvature than the radius of curvature of said concave portion for meeting with the said concave portion of the bottom of the container and said follower having a central hollow portion for forming a space which communicates with the inlet of said conduit when the follower occupies its lowermost position; and means for introducing a gas under pressure within said container.

3. Apparatus for filling sausage skins with filling material, said apparatus comprising a container for holding sausage filling material, said container having lateral confining means and a bottom with an interior concave portion and said container being able to receive and hold a gas under pressure; a vertically disposed conduit in said container with an inlet near the bottom of said container in proximity to said concave portion, through which conduit sausage filling material can be discharged from said container for filling into sausage skins; a follower in said container and which is guided for vertical movement in said container by said conduit, said follower having its perimetric portions spaced from the lateral confining means of the container and said follower having a convex portion for meeting with the said concave portion of the bottom of the container, the radius of curvature of said convex portion being greater than the radius of curvature of said concave portion; and means for introducing a gas under pressure within said container.

4. Apparatus for filling sausage skins with filling material, said apparatus comprising a container for holding sausage filling material, said container having lateral confining means and a bottom with an interior concave portion and said container being able to receive and hold a gas under pressure; a vertically disposed conduit in said container with an inlet near the bottom of said container in proximity to said concave portion, through which a conduit sausage filling material can be discharged from said container for filling into sausage skins; a follower in said container and which is guided in substantially fluid tight relationship by said conduit for vertical movement in said container, said follower having its perimetric portions spaced from the lateral confining means of the container, a convex portion for meeting with the said concave portion of the bottom of the container with the radius of curvature of said convex portion greater than the radius of curvature of said concave portion and a central hollow portion for forming a space which communicates with the inlet of said conduit when the follower occupies its lowermost position; and means for introducing a gas under pressure within said container above the said follower.

KARL GÖTZINGER.